United States Patent
Aga et al.

(10) Patent No.: US 7,015,275 B1
(45) Date of Patent: Mar. 21, 2006

(54) AQUEOUS WATER-AND OIL-REPELLENT DISPERSION

(75) Inventors: Tsukasa Aga, Settsu (JP); Masahiro Miyahara, Settsu (JP); Masaki Fukumori, Settsu (JP); Ryosuke Hara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/958,078

(22) PCT Filed: Apr. 4, 2000

(86) PCT No.: PCT/JP00/02169

§ 371 (c)(1),
(2), (4) Date: Oct. 4, 2001

(87) PCT Pub. No.: WO00/61696

PCT Pub. Date: Oct. 19, 2000

(30) Foreign Application Priority Data

Apr. 7, 1999 (JP) ................................. 11-099978

(51) Int. Cl.
*C08K 3/00* (2006.01)
(52) U.S. Cl. .................. 524/544; 524/545; 524/546
(58) Field of Classification Search ................ 524/544, 524/545, 546
See application file for complete search history.

(56) References Cited

U.S. PATENT DOCUMENTS 6,753,376 B1 * 6/2004 Yamana et al. ............. 524/544

FOREIGN PATENT DOCUMENTS

| EP | 0 909 802 A1 | 4/1999 |
|---|---|---|
| JP | 60-40182 | 3/1985 |
| JP | 3-243685 | 10/1991 |
| JP | 6-17034 | 1/1994 |
| JP | 6-33043 | 2/1994 |
| JP | 9-302335 | 11/1997 |
| JP | 10-8041 | 1/1998 |

OTHER PUBLICATIONS

International Search Report for PCT/JP00/02169 dated Jun. 20, 2000.
International Preliminary Examination Report for PCT/JP00/02169 dated Apr. 11, 2001.

* cited by examiner

*Primary Examiner*—Edward J. Cain
(74) *Attorney, Agent, or Firm*—Sughrue Mion, PLLC

(57) ABSTRACT

An aqueous water- and oil-repellent dispersion containing: (A) a homopolymer or copolymer containing at least one polymerizable compound having a perfluoroalkyl or perfluoroalkenyl group and an acrylate or methacrylate group, or a copolymer containing said polymerizable compound and another compound copolymerizable therewith, (B) a surfactant comprising a cationic surfactant and a nonionic surfactant comprising an alkylene oxide adduct of a higher aliphatic secondary alcohol, and (C) a high flash-point organic solvent, has durable water- and oil-repellency and excellent storage stability.

4 Claims, No Drawings

AQUEOUS WATER- AND OIL-REPELLENT DISPERSION

FIELD OF THE INVENTION

The present invention relates to an aqueous water- and oil-repellent dispersion comprising a polymer containing a polymerizable compound having a perfluoroalkyl or perfluoroalkenyl group and an acrylate or methacrylate group, which can impart the water- and oil-repellency to various fibers.

RELATED ARTS

It is well known that a polymer of a polymerizable compound having a perfluoroalkyl or perfluoroalkenyl group and an acrylate or methacrylate group can be used as a water- and oil-repellent for a fibrous fabric. An aqueous dispersion which is prepared by dispersing the polymer in an aqueous medium by means of an emulsifier is widely and industrially used. However, the water- and oil-repellency of a fibrous fabric treated with usual conventional aqueous dispersions is not satisfactory for resistance, namely durability, to physical action such as friction. In addition, the conventional aqueous dispersions do not have excellent storage stability even if they have the durable water- and oil-repellency.

SUMMARY OF THE INVENTION

One of the objects of the present invention is to provide an aqueous water- and oil-repellent dispersion having durable water- and oil-repellency and excellent storage stability.

The present invention provides an aqueous water- and oil-repellent dispersion comprising:

(A) a homopolymer or copolymer comprising at least one polymerizable compound having a perfluoroalkyl or perfluoroalkenyl group and an acrylate or methacrylate group, or
   a copolymer comprising said polymerizable compound and another compound copolymerizable therewith,
(B) a surfactant comprising a cationic surfactant and a nonionic surfactant comprising an alkylene oxide adduct of a higher aliphatic secondary alcohol, and
(C) a high flash-point organic solvent.

DETAILED EXPLANATION OF THE INVENTION

In the copolymer, which is the polymer (A), comprising the polymerizable compound having the perfluoroalkyl or perfluoroalkenyl group and the acrylate or methacrylate group and the another compound copolymerizable therewith, the former compound is in the amount of at least 25% by weight, preferably at least 40% by weight based on the weight of the copolymer.

Examples of the polymerizable compound having the perfluoroalkyl or perfluoroalkenyl group and the acrylate or methacrylate group include (meth)acrylates represented by the formulas:

  (1)

  (2)

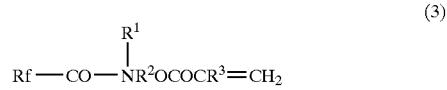  (3)

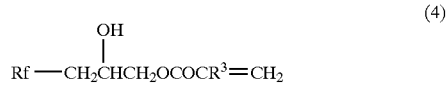  (4)

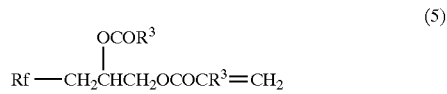  (5)

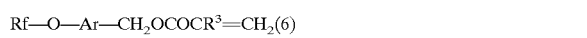  (6)

wherein Rf is a perfluoroalkyl or perfluoroalkenyl group having 3 to 21 carbon atoms,
$R^1$ is a hydrogen atom or an alkyl group having 1 to 10 carbon atoms,
$R^2$ is an alkylene group having 1 to 10 carbon atoms,
$R^3$ is a hydrogen atom or a methyl group,
Ar is an aryl group which optionally has a substituent group, and
n is an integer of 1 to 10.

Specific examples of the polymerizable compound include:

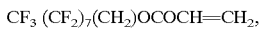

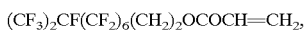

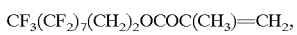

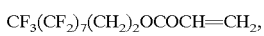

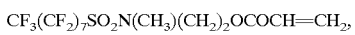

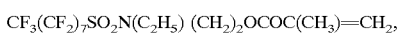

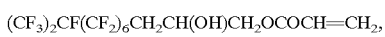

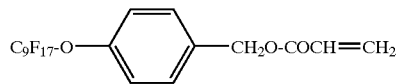

and

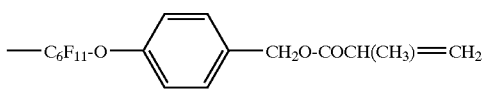

The another copolymerizable compound are various. Examples of the another copolymerizable compound include: (1) acrylic acid and methacrylic acid, and methyl, ethyl, butyl, isobutyl, t-butyl, propyl, 2-ethylhexyl, hexyl, decyl, isodecyl, lauryl, stearyl, isostearyl, isobornyl, β-hydroxyethyl, glycidyl, phenyl, benzyl and 4-cyanophenyl esters thereof; (2) vinyl esters of fatty acids such as acetic acid, propionic acid, caprylic acid, lauric acid and stearic acid; (3) styrene compounds such as styrene, α-methylstyrene and p-methylstyrene; (4) vinyl halides and vinylidene compounds such as vinyl fluoride, vinyl chloride, vinyl bromide, vinylidene fluoride and vinylidene chloride; (5) fatty acid allyl esters such as allyl heptanoate, allyl caprylate and allyl caproate; (6) vinyl alkyl ketones such as vinyl methyl ketone and vinyl ethyl ketone; (7) acryl amides such as N-methylacrylamide and N-methylolmethacrylamide; and (8) dienes such as 2,3-dichloro-1,3-butadiene and isoprene.

The surfactant (B) comprises (B-1) a cationic surfactant and (B-2) a nonionic surfactant comprising an alkylene oxide adduct of a higher aliphatic secondary alcohol.

The cationic surfactant includes dodecyl trimethyl ammonium acetate, trimethyl tetradecyl ammonium chloride, hexadecyl trimethyl ammonium bromide, trimethyl octadecyl ammonium chloride, behenyl trimethyl ammonium chloride, (dodecylmethybenzyl) trimethyl ammonium chloride, didodecyl dimethyl ammonium chloride, dioctadecyl dimethyl ammonium chloride, benzyl dodecyldimethyl ammonium chloride, benzyl tetradecyl dimethyl ammonium chloride, benzyl octadecyl dimethyl ammonium chloride, methyl dodecyl di(hydropolyoxyethylene) ammonium chloride, benzyl dodecyl di(hydropolyoxyethylene) ammonium chloride and N-[2-(diethylamino)ethyl]oleamide hydrochloride.

The nonionic surfactant (B-2) comprises an alkylene oxide adduct of a higher aliphatic secondary alcohol. The higher aliphatic secondary alcohol is preferably a monohydric alcohol having 8–30 carbon atoms, for example 10–18 carbon atoms, particularly 11–15 carbon atoms. The alkylene oxide may be ethylene oxide or propylene oxide. The polymerization degree of alkylene oxide may be for example, from 2 to 50, particularly from 5 to 30.

A weight ratio of the cationic surfactant (B-1) to the nonionic surfactant (B-2) is from 1:9 to 9:1, for example, from 1:9 to 5:5.

The amount of the surfactant (B) may be from 0.01 to 30 parts by weight, for example from 1 to 20 parts by weight, based on 100 parts by weight of the polymer (A).

The high flash point organic solvent (C) may be a water-soluble glycol organic solvent having a flash point of at least 70° C.

Specific examples of the organic solvent (C) include propylene glycol, dipropylene glycol, dipropylene glycol monomethyl ether, dipropylene glycol monoethyl ether, tripropylene glycol, tripropylene glycol monomethyl ether, 1,6-hexanediol and 1,5-pentanediol.

The amount of the organic solvent (C) may be from 5 to 200 parts by weight, for example from 10 to 100 parts by weight, particularly from 20 to 80 parts by weight, based on 100 parts of the polymer (A).

The dispersion according to the present invention can be prepared by emulsion-polymerizing the polymerizable compound(s) in water accompanied by the organic solvent (C) in the presence of the surfactant (B) to give an emulsion of the polymer (A). Water and/or surfactant may be added to the emulsion of the polymer (A).

Examples of a suitable substrate, to which the dispersion according to the present invention is applied, include a film, a fiber, a yarn, a woven fabric, a carpet, a filament made from a natural polymer material, a modified natural polymer material and a synthetic polymer material, and a product made from a fiber and a yarn. The substrate is preferably a textile which is in the form of a fiber, a yarn or a fabric.

The dispersion according to the present invention can be applied to the substrate preferably by coating, dipping, spraying, padding, roll coating, or combination of these procedures. For example, a padding bath having the bath solid content of 0.1 to 10% by weight can be used. The substrate is padded in the bath, and then excess liquid is usually removed by a squeezing roll to give the dry pickup amount (the weight of dry polymer on the substrate) of from 0.01 to 10% by weight based on the weight of the substrate. Then, the treated substrate is preferably heated at 100–200° C.

PREFERRED EMBODIMENTS OF THE INVENTION

Examples and Comparative Examples are shown hereinafter to illustrate the present invention in detail.

Properties are determined as follows:

Water- and Oil-Repellency

The polymer dispersion liquid is diluted with water to give a treatment liquid having a solid content of 0.08% by weight. A polyester fabric is immersed in the treatment liquid, squeezed with a mangle to give a wet pickup of 65%, dried at 100° C. for two minutes, heated at 160° C. for one minute, and then subjected to an evaluation of water- and oil-repellency.

The water-repellency is expressed by the water repellency No. (cf. the following Table 1) determined by the spray method according to JIS (Japanese Industrial Standard) L-1092.

The oil-repellency is determined by dropping several drops of a test solution shown in the following Table 2 according to AATCC-TM118 on two positions of a surface of a test cloth and observing the penetration state of the drops after 30 seconds. The maximum point at which the test solution exhibits no penetration is expressed by the oil-repellency.

TABLE 1

| Water repellency No. | State |
|---|---|
| 5 | No wet on the surface |
| 4 | Slight wet on the surface |
| 3 | Partial wet on the surface |
| 2 | Wet on the surface |
| 1 | Wet over the whole surface |

TABLE 2

| Oil-repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |

TABLE 2-continued

| Oil-repellency | Test solution | Surface tension (dyne/cm, 25° C.) |
| --- | --- | --- |
| 4 | n-Tetradecane | 26.7 |
| 3 | n-Hexadecane | 27.3 |
| 2 | n-Hexadecane/Nujol mixture solution (35/65 by weight) | 29.6 |
| 1 | Nujol | 31.2 |
| 0 | Inferior to 1 | — |

Mechanical Stability

The aqueous dispersion is diluted with tap water to give a solid content of 0.2% by weight. The diluted dispersion is stirred in a homomixer at 3,000 rpm for 10 minutes and generated scum is filtered with a black cotton fabric.
○: No scum generated
Δ: Slight scum generated
X: Much scum generated Chemical Stability The aqueous dispersion is diluted with tap water to give a solid content of 0.6% by weight. 0.03% by weight of a fixing agent for nylon is added to the diluted dispersion and intimately stirred. The generation of agglomeration is observed.
○: No agglomeration generated
Δ: Slight agglomeration generated
X: Much agglomeration generated Storage Stability After the aqueous dispersion (solid content: 30% by weight) is stored at 40° C. for one month, the generation of precipitation is observed.
○: No precipitation
Δ: Slight precipitation
X: Much precipitation

EXAMPLE 1

100 g of $C_nF_{2n+1}CH_2CH_2OCOCH=CH_2$ (n is 6, 8, 10, 12 and 14 (average of n is 8)), 48 g of stearyl acrylate, 2 g of N-methylol acrylamide, 200 g of pure water, 40 g of tripropylene glycol (flash point: 110° C.), 0.3 g of acetic acid, 4 g of trimethyloctadecyl ammonium chloride and 10 g of sec-$C_nH_{2n+1}O(C_2H_4O)_{20}H$ (n=11 to 15) were charged into a 1 L autoclave and emulsified at 60° C. for 15 minutes by means of ultrasonic wave with stirring. 0.75 g of azobisisobutylamidine dihydrochloride was added and the reaction was continued for 5 hours to give an aqueous water- and oil-repellent dispersion.

The water- and oil-repellency, the mechanical stability, the chemical stability and the storage stability of the aqueous water- and oil-repellent dispersion were evaluated. The results are shown in Table B.

EXAMPLES 2 TO 4

The same procedure as in Example 1 was repeated except that the type of the monomer, the type of the cationic surfactant, the type of the nonionic surfactant and the type and amount of the high flash point organic solvent were changed as shown in Table A. The results are shown in Table B.

EXAMPLE 5

100 g of $C_nF_{2n+1}CH_2CH_2OCOCH=CH_2$ (n is 6, 8, 10, 12 and 14 (average of n is 8)), 8 g of 2-ethylhexyl methacrylate, 2 g of N-methylol acrylamide, 200 g of pure water, 50 g of tripropylene glycol monomethyl ether (flash point: 110° C.), 0.3 g of acetic acid, 4 g of benzyldodecyldimethyl ammonium chloride and 10 g of sec-$C_nH_{2n+1}O(C_2H_4O)_{20}H$ (n=11 to 15) were charged into a 1 L autoclave and emulsified at 60° C. for 15 minutes by means of ultrasonic wave with stirring. Then 40 g of vinyl chloride was press into the autoclave. 0.75 g of azobisisobutylamidine dihydrochloride was added and the reaction was continued for 5 hours to give an aqueous water- and oil-repellent dispersion.

The water- and oil-repellency, the mechanical stability, the chemical stability and the storage stability of the aqueous water- and oil-repellent dispersion were evaluated. The results are shown in Table B.

EXAMPLES 6 TO 8

The same procedure as in Example 5 was repeated except that the type of the monomer, the type of the cationic surfactant, the type of the nonionic surfactant and the type and amount of the high flash point organic solvent were changed as shown in Table A. The results are shown in Table B.

COMPARATIVE EXAMPLE 1

The same procedure as in Example 1 was repeated except that sec-$C_nH_{2n+1}O(C_2H_4O)_{20}H$ (n=11 to 15) was not used.

COMPARATIVE EXAMPLE 2

The same procedure as in Example 1 was repeated except that trimethyl octadecyl ammonium chloride was not used.

COMPARATIVE EXAMPLE 3

The same procedure as in Example 1 was repeated except that n-$C_{12}H_{25}O(C_2H_4O)_{20}H$ was used instead of sec-$C_nH_{2n+1}O(C_2H_4O)_{20}H$ (n 11 to 15).

COMPARATIVE EXAMPLE 4

The same procedure as in Example 1 was repeated except that acetone (flash point: −17° C.) was used instead of tripropylene glycol.

COMPARATIVE EXAMPLE 5

The same procedure as in Example 5 was repeated except that sec-$C_nH_{2n+1}O(C_2H_4O)_{20}H$ (n=11 to 15) was not used.

COMPARATIVE EXAMPLE 6

The same procedure as in Example 5 was repeated except that benzyldodecyldimethyl ammonium chloride was not used.

COMPARATIVE EXAMPLE 7

The same procedure as in Example 5 was repeated except that n-$C_{12}H_{25}O(C_2H_4O)_{20}H$ was used instead of sec-$C_nH_{2n+1}O(C_2H_4O)_{20}H$ (n=11 to 15).

COMPARATIVE EXAMPLE 8

The same procedure as in Example 5 was repeated except that acetone (flash point: −17° C.) was used instead of tripropylene glycol monomethyl ether.

TABLE A

| | Copolymer (Weight ratio) | Cationic surfactant | Nonionic surfactant | Type and amount of high flash point organic solvent |
|---|---|---|---|---|
| Example 1 | FA/StA/N-MAM = 100/48/2 | Trimethyloctadecyl ammonium chloride | sec-$C_nH_{2n+1}O(C_2H_4O)_{20}H$ (n = 11 to 15) | Tripropylene glycol 40 g |
| Example 2 | FA/StMA/CHPMA = 110/38/2 | Trimethyloctadecyl ammonium chloride | sec-$C_nH_{2n+1}O(C_2H_4O)_{30}H$ (n = 11 to 15) | Dipropylene glycol 70 g |
| Example 3 | SFA/2EHMA/DAAM = 120/28/2 | Dioctadecyldimethyl ammonium chloride | sec-$C_nH_{2n+1}O(C_2H_4O)_{12}H$ (n = 11 to 15) | Dipropylene glycol monomethyl ether 30 g |
| Example 4 | FA/StA/2EHMA/ DAAM = 110/20/18/2 | Dioctadecyldimethyl ammonium chloride | sec-$C_nH_{2n+1}O(C_2H_4O)_{15}H$ (n = 11 to 15) | Propylene glycol 90 g |
| Example 5 | FA/VCl/2EHMA/ N-MAM = 100/40/8/2 | Benzyldodecyldimethyl ammonium chloride | sec-$C_nH_{2n+1}O(C_2H_4O)_{20}H$ (n = 11 to 15) | Tripropylene glycol monomethyl ether 50 g |
| Example 6 | FMA/VCl/2EHMA/ CHPMA = 110/30/8/2 | Benzyldodecyldimethyl ammonium chloride | sec-$C_nH_{2n+1}O(C_2H_4O)_{30}H$ (n = 11 to 15) | Dipropylene glycol monoethyl ether 60 g |
| Example 7 | FA/VCl/StMA/DAAM = 120/20/8/2 | Trimethyloctadecyl ammonium chloride | sec-$C_nH_{2n+1}O(C_2H_4O)_{12}H$ (n = 11 to 15) | 1,6-Hexanediol 120 g |
| Example 8 | FMA/VCl/StA/N-MAM = 110/20/18/2 | Dioctadecyldimethyl ammonium chloride | sec-$C_nH_{2n+1}O(C_2H_4O)_{15}H$ (n = 11 to 15) | 1,5-Pentanediol 100 g |

The abbreviations shown in Table A indicate the following compounds.

FA: $C_nF_{2n+1}CH_2CH_2OCOCH=CH_2$ (n=6,8,10,12,14; Average is 8)
FMA: $C_nF_{2n+1}CH_2CH_2OCOC(CH_3)=CH_2$ (n=6,8,10,12,14; Average is 8)
SFA: $C_8F_{17}SO_2N(CH_3)CH_2CH_2OCOCH=CH_2$
StA: Stearyl acrylate
StMA: Stearyl methacrylate
2EHMA: 2-Ethylhexyl methacrylate
VCl: Vinyl chloride
N-MAM: N-Methylol acrylamide
CHPMA: 3-Chloro-2-hydroxypropyl methacrylate
DAAM: Diacetone acrylamide

TABLE B

| | Water- and oil-repellency | | | | | | | | |
|---|---|---|---|---|---|---|---|---|---|
| | Initial | | Durability | | | | | | |
| | HL-0 | | HL-3 | | DC-3 | | | | |
| | Water-repellency | Oil-repellency | Water-repellency | Oil-repellency | Water-repellency | Oil-repellency | Mechanical stability | Chemical stability | Storage stability |
| Example 1 | 5 | 6 | 4 | 4 | 4 | 3 | ○ | ○ | ○ |
| Example 2 | 5 | 6 | 4 | 4 | 4 | 3 | ○ | ○ | ○ |
| Example 3 | 5 | 7 | 5 | 5 | 4 | 4 | ○ | ○ | ○ |
| Example 4 | 5 | 6 | 4 | 4 | 4 | 3 | ○ | ○ | ○ |
| Example 5 | 5 | 7 | 4 | 6 | 5 | 4 | ○ | ○ | ○ |
| Example 6 | 5 | 7 | 4 | 6 | 5 | 5 | ○ | ○ | ○ |
| Example 7 | 5 | 6 | 5 | 6 | 5 | 4 | ○ | ○ | ○ |
| Example 8 | 5 | 6 | 4 | 5 | 5 | 4 | ○ | ○ | ○ |
| Com. Ex. 1 | 5 | 6 | 4 | 4 | 3 | 3 | ○ | X | ○ |
| Com. Ex. 2 | 4 | 5 | 3 | 3 | 3 | 2 | ○ | ○ | X |
| Com. Ex. 3 | 5 | 5 | 4 | 3 | 3 | 3 | X | ○ | ○ |
| Com. Ex. 4 | 5 | 6 | 4 | 4 | 4 | 2 | ○ | ○ | Δ |
| Com. Ex. 5 | 5 | 7 | 4 | 4 | 4 | 4 | ○ | X | ○ |
| Com. Ex. 6 | 4 | 6 | 3 | 3 | 4 | 3 | ○ | ○ | X |
| Com. Ex. 7 | 5 | 6 | 4 | 3 | 4 | 4 | X | ○ | ○ |
| Com. Ex. 8 | 5 | 7 | 4 | 4 | 5 | 3 | ○ | ○ | Δ |

Note) HL-0: Initial (before washing and cleaning)
HL-3: After 3 times washing according to a JIS L-0217-103 method
DC-3: After 3 times dry cleaning according to a JIS L-1092-322 method

EFFECTS OF THE INVENTION

The aqueous dispersion according to the present invention has durable water- and oil-repellency and excellent storage stability.

What is claimed is:

1. An aqueous water- and oil-repellent dispersion comprising:
   (A) a homopolymer or copolymer comprising at least one polymerizable compound having a perfluoroalkyl or perfluoroalkenyl group and an acrylate or methacrylate group, or
   a copolymer comprising said polymerizable compound and another compound copolymerizable therewith,
   (B) a surfactant comprising a cationic surfactant and a nonionic surfactant comprising an alkylene oxide adduct of a higher aliphatic monohydric secondary alcohol having 8 to 30 carbon atoms, and
   (C) a high flash-point organic solvent.

2. The dispersion according to claim 1, wherein the high flash point organic solvent is a water-soluble glycol organic solvent having a flash point of at least 70° C.

3. A textile, to which the dispersion according to claim 1 is applied.

4. A method of processing a textile, comprising treating the textile with the dispersion according to claim 1.

* * * * *